(12) United States Patent
Kimura (10) Patent No.: US 8,909,204 B2
(45) Date of Patent: Dec. 9, 2014

(54) PORTABLE ELECTRONIC DEVICE

(75) Inventor: Takayuki Kimura, Osaka (JP)

(73) Assignee: KYOCERA Corporation, Kyoto (JP)

( * ) Notice: Subject to any disclaimer, the term of this patent is extended or adjusted under 35 U.S.C. 154(b) by 93 days.

(21) Appl. No.: 13/610,619

(22) Filed: Sep. 11, 2012

(65) Prior Publication Data

US 2013/0078973 A1   Mar. 28, 2013

(30) Foreign Application Priority Data

Sep. 28, 2011   (JP) .................................. 2011-212557

(51) Int. Cl.
*H04M 3/42*   (2006.01)
*G06F 3/0488*   (2013.01)
*H04M 19/04*   (2006.01)

(52) U.S. Cl.
CPC ......... *H04M 19/045* (2013.01); *G06F 3/04883* (2013.01)
USPC ....................................................... 455/415

(58) Field of Classification Search
CPC .................... H04W 8/22; H04W 4/12
See application file for complete search history.

(56) References Cited

U.S. PATENT DOCUMENTS

| | | | |
|---|---|---|---|
| 2003/0064759 A1* | 4/2003 | Kurokawa et al. | 455/566 |
| 2009/0028312 A1* | 1/2009 | Karnalkar et al. | 379/201.01 |
| 2009/0160802 A1* | 6/2009 | Yasumi | 345/173 |
| 2011/0237230 A1* | 9/2011 | Li et al. | 455/414.1 |
| 2012/0176322 A1* | 7/2012 | Karmi et al. | 345/173 |
| 2012/0242704 A1* | 9/2012 | Bamford et al. | 345/660 |

FOREIGN PATENT DOCUMENTS

| | | |
|---|---|---|
| JP | 2004-200853 A | 7/2004 |
| JP | 2006-311224 A | 11/2006 |

* cited by examiner

*Primary Examiner* — Patrick Edouard
*Assistant Examiner* — Shantell L Heiber
(74) *Attorney, Agent, or Firm* — Studebaker & Brackett PC

(57) ABSTRACT

A portable electronic device includes a communication request receiving unit which receives a communication request from another communication device, a display unit which displays an image based on image data, an input unit which is provided to overlap with the display unit and detects an input of a user, a determination unit which determines whether the image is being displayed on the display unit when the communication request receiving unit receives the communication request, an input determination unit which determines whether a predetermined input is detected by the input unit when the determination unit determines that the image is being displayed, and a display control unit which displays information for starting a communication with the other communication device on the display unit when the predetermined input is detected by the input unit.

14 Claims, 7 Drawing Sheets

PORTABLE ELECTRONIC DEVICE

CROSS-REFERENCE TO RELATED APPLICATION

This application claims priority from Japanese Patent Application No. 2011-212557, filed on Sep. 28, 2011, the entire subject matter of which is incorporated herein by reference.

BACKGROUND OF THE INVENTION

1. Field of the Invention

The present invention relates to a portable electronic device having a touch panel display.

2. Description of the Related Art

There has been known a portable electronic device having a touch panel. Recently, such portable electronic devices are configured to implement complex functions comparable with personal computers and the like. When selecting an icon displayed on a display, a user can directly press the displayed icon to select it. Also, there has been known a portable electronic devices employing a plurality of communication methods (for example, refer to JP-A-2006-311224 or JP-A-2004-200853).

SUMMARY OF THE INVENTION

However, in a case where a certain function is being executed in the above portable electronic device, when an incoming call is detected at the time when a user is about to make an operation to the certain function being executed, the operation of the user may be treated as a response to the incoming call, rather than to the certain function. In this case, the user has to respond to the incoming call at an unintended timing of the user, so that the usability is lowered.

Accordingly, the present invention has been made in view of the above circumstances, and an aspect of the present invention provides a portable electronic device capable of avoiding responding to an incoming call at an unintended timing of a user when the incoming call is detected while a certain function is being executed in the portable electronic device.

According to an illustrative embodiment of the present invention, there is provided a portable electronic device comprising: a communication request receiving unit which receives a communication request from another communication device; a display unit which displays an image based on image data; an input unit which is provided to overlap with the display unit and detects an input of a user; a determination unit which determines whether the image is being displayed on the display unit when the communication request receiving unit receives the communication request; an input determination unit which determines whether a predetermined input is detected by the input unit when the determination unit determines that the image is being displayed; and a display control unit which displays information for starting a communication with the other communication device on the display unit when the predetermined input is detected by the input unit.

According to another illustrative embodiment of the present invention, there is provided a control method of a portable electronic device which includes a display unit and an input unit provided to overlap with the display unit, the control method comprising: receiving a communication request from another communication device; displaying an image based on image data on the display unit; detecting an input of a user by the input unit; determining whether the image is being displayed on the display unit when the communication request is received; determining whether a predetermined input is detected by the input unit when it is determined that the image is being displayed; and displaying information for starting a communication with the other communication device on the display unit when it is determined that the predetermined input is detected by the input unit.

According to the above configuration, it is possible to avoid responding to an incoming call at an unintended timing of a user.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION OF THE INVENTION

Hereinafter, a portable phone 100 which is an example of a portable electronic device according to an illustrative embodiment of the present invention will be described.

Figure 1:
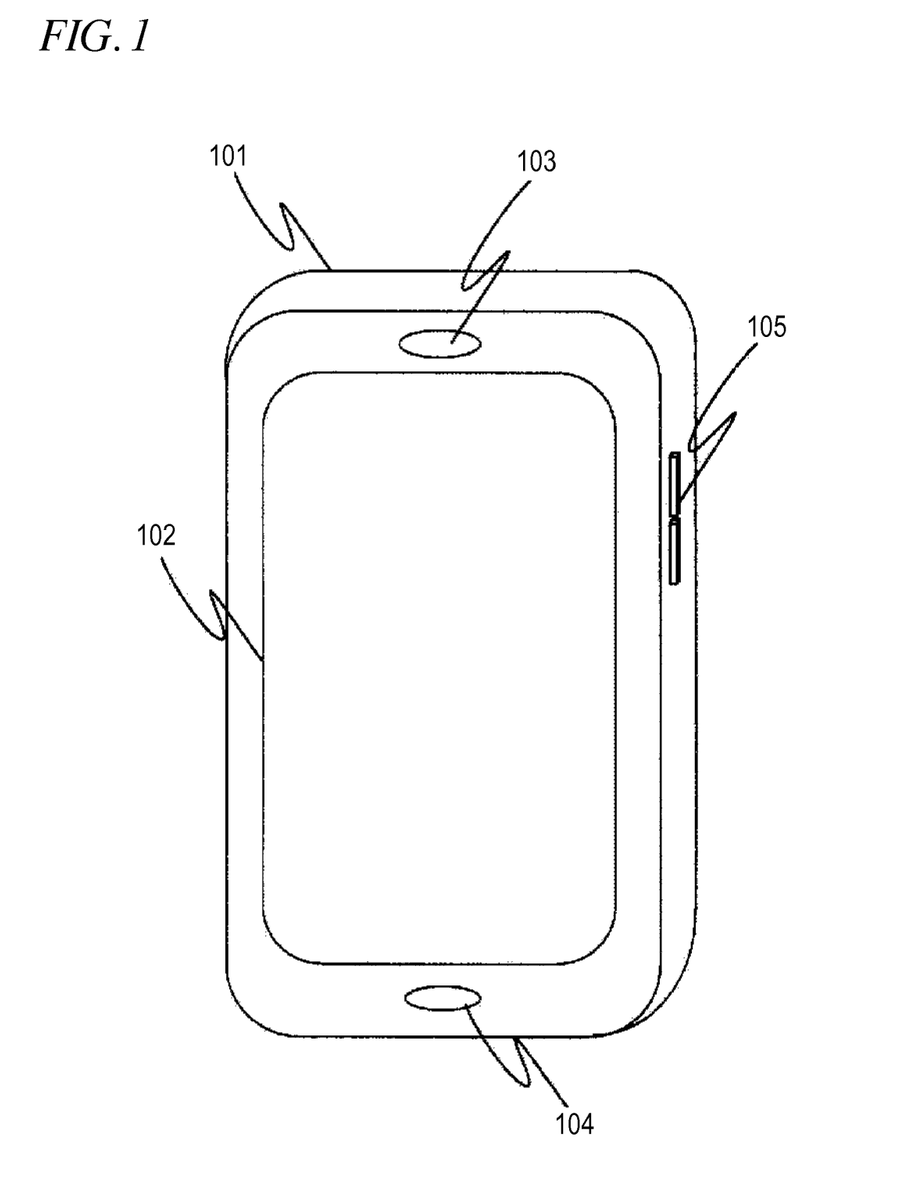
FIG. 1 is an outer perspective view of a portable phone.

FIG. 1 is an outer perspective view of the portable phone 100. A housing is provided with a touch panel 102, a speaker 103, a microphone 104 and an operation unit 105. The touch panel 102 displays a key group such as cursor key and number pad, an icon and the like based on an instruction from a user.

Figure 2:
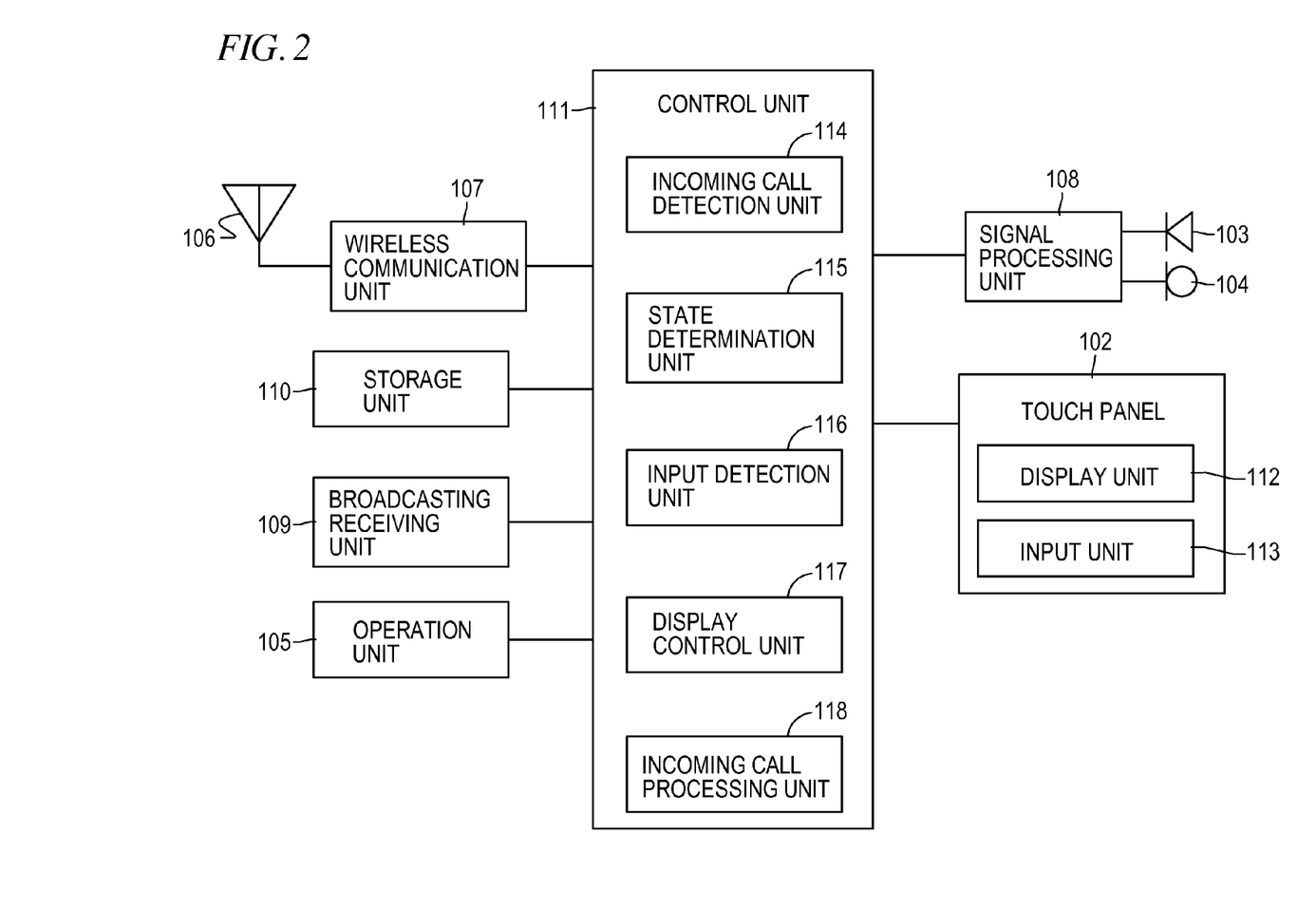
FIG. 2 shows a configuration of the portable phone.

FIG. 2 shows a configuration of the portable phone 100. The portable phone 100 includes a wireless communication unit 107, the microphone 104, the speaker 103, a signal processing unit 108, a broadcasting receiving unit 109, the operation unit 105, the touch panel 102, a storage unit 110 and a control unit 111.

The wireless communication unit 107 modulates/demodulates a signal which is transmitted and received through an antenna 106. Also, the wireless communication unit 107 can receive a call request through the antenna 106, which is transmitted from another portable phone. The wireless communication unit 107 outputs the received call request to the control unit 111. Also, the wireless communication unit 107 can receive data such as electronic mail and the like, which is transmitted from another portable phone, and output the same to the control unit 111.

The signal processing unit 108 performs processing of transmitting a voice signal, which is input from the microphone 104, through the wireless communication unit 107 and outputting a voice signal, which is received through the wireless communication unit 107 from the antenna 106, to the speaker 103.

The microphone 104 outputs input voice to the signal processing unit 108, as the voice signal.

The speaker 103 outputs, as voice, the voice signal processed in the signal processing unit 108 or voice data received from the control unit 111.

The broadcasting receiving unit 109 can receive television broadcasting waves such as digital broadcasting, based on an instruction from the control unit 111. The broadcasting receiving unit 109 outputs the received television broadcasting to the control unit 111. In the meantime, the television broadcasting may include a plurality of broadcasting programs or one broadcasting program. The broadcasting receiving unit 109 may receive one broadcasting program, which is selected from the plurality of broadcasting programs included in the television broadcasting waves by the user, and then output the received broadcasting program to the control unit 111. Also, the broadcasting receiving unit 109 may receive the plurality of broadcasting programs included in the television broadcasting waves and output one broadcasting program selected by the user to the control unit 111. The broadcasting program output to the control unit 111 is displayed on a display unit 112 (described later).

The operation unit 105 can receive an operation of the user. The operation unit 105 outputs the received operation to the control unit 111. The operation unit 105 is configured by a hard key and the like.

The touch panel 102 includes the display unit 112 and an input unit 113.

The display unit 112 includes an LCD (Liquid Crystal Display) and has a function of displaying an image representing letters and icons and the broadcasting program received by the broadcasting receiving unit 109 on the LCD, based on an instruction from the control unit 111.

The input unit 113 detects a touch of the user and outputs a coordinate value of a position being touched to the control unit 111 and to the storage unit 110 every unit time (for example, 1/60 second) during the detection. Herein, the touch means that the user brings a finger and the like into contact with the input unit 113. A detach means that while the user touches the input unit 113 with the finger, the user detaches the touching finger from the input unit 113. A slide means that when the user touches the input unit 113 with the finger, the user moves the finger while maintaining the touching state. The input unit 113 determines that the touch is made when the coordinate value is detected. The input unit 113 determines that the detach is made when the coordinate value being detected is not detected any more. The input unit 113 determines that the slide is made when the coordinate value being detected varies as time goes. In the meantime, the object touching the input unit 113 is not limited to the finger of the user. That is, a pen and the like may be also used in addition to the finger of the user. The input unit 113 may be implemented by any method such as resistance film method, optical method, electrostatic capacity combined method and the like, which are generally used for the touch panel 102. Also, the input unit 113 can detect multiple touches of the user at the same time. Therefore, while the input unit 113 detects one touch of the user, it can detect a new touch of the user. Also, the input unit 113 can output a coordinate value of a position touched already and a coordinate value of a position newly touched to the control unit 111.

The storage unit 110 includes a ROM, a RAM, an EEPROM, a non-volatile RAM, a flash memory, an HDD and the like and stores therein programs and the like which are processed in the control unit 111.

Also, the storage unit 110 has a function of storing the coordinate values output from the input unit 113 every unit time (for example, 1/60 second) while detecting the touch of the user. That is, the storage unit 110 stores the coordinate values which are output between the touch state and the detach state. Also, the storage unit 110 can store at least one or more portable phone numbers.

The control unit 111 controls an overall operation of the portable phone 100 and includes an incoming call detection unit 114, a state determination unit 115, an input detection unit 116, a display control unit 117, and an incoming call processing unit 118. The control unit 111 is a processing means such as CPU (Central Processing Unit), for example.

The incoming call detection unit 114 can detect whether the call request is received from another portable phone through the antenna 106. When the call request is detected, the incoming call detection unit 114 outputs the detected call request to the state determination unit 115 and the display control unit 117. In the meantime, the call request is a request which is transmitted from another portable phone and is a request for call start with the portable phone 100. The user can respond to the call request transmitted from the other portable phone and thus start a call with the other portable phone having transmitted the call request.

When the call request is received, the state determination unit 115 can determine whether the broadcasting receiving unit 109 is receiving the television broadcasting waves. The state determination unit 115 outputs a result of the determination to the display control unit 117.

When the call request is received in a state where the broadcasting program is being displayed on the display unit 112, the input detection unit 116 determines whether the user's touch detected by the input unit 113 is a predetermined touch input. The predetermined touch input means that a position of the user's touch detected by the input unit 113 is within an area where call request information is displayed (described later) or that a position of the user's touch detected by the input varies every unit time, for example. The former example is a case where the user touches an inside of the area where the call request information is displayed. The latter example is a case where the user touches and then performs the slide operation.

The display control unit 117 can control the display of the display unit 112 in accordance with the outputs from the incoming call detection unit 114, the state determination unit 115 and the input detection unit 116. FIGS. 3 to 7 illustrate examples of the display control of the display unit 112. In this illustrative embodiment, an image which is displayed on the display unit 112 may also be referred to as a screen. In the meantime, the display control unit 117 may control the image and the like to be displayed on the display unit 112, irrespective of the outputs from the incoming call detection unit 114, the state determination unit 115 and the input detection unit 116.

Figure 3:
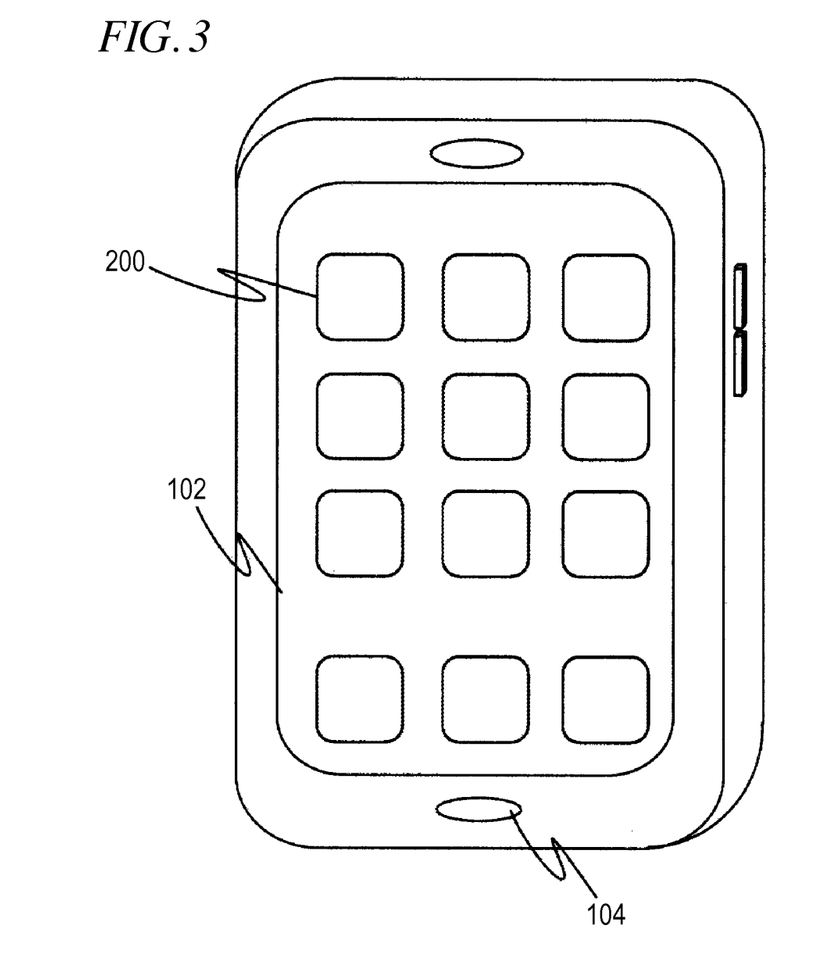
FIG. 3 shows an example of an image which is displayed on a display unit.

FIG. 3 shows an image (hereinafter, also referred to as first image) which is displayed on the display unit 112 by the display control unit 117 when a call request is not received in a state where the broadcasting receiving unit 109 does not receive the television broadcasting waves. The first image is a standby screen. In the first image, icons 200 indicative of application programs stored in the storage unit 110 are displayed. The user can touch an icon 200 to thus execute an application program associated with the icon 200.

Figure 4:
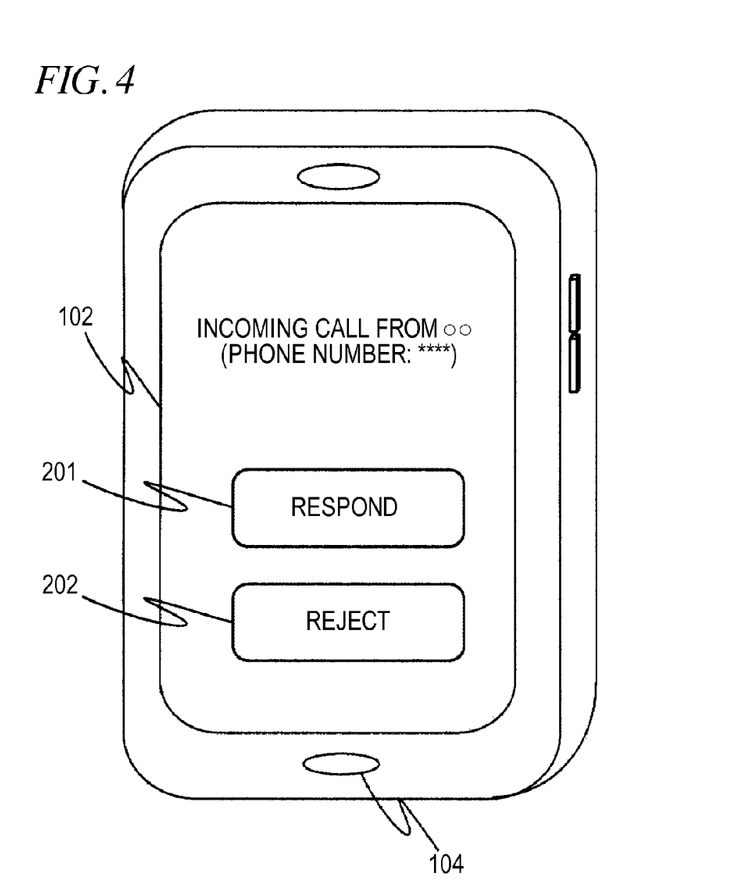
FIG. 4 shows an example of an image which is displayed on the display unit.

FIG. 4 shows an image (hereinafter, also referred to as second image) which is displayed on the display unit 112 by the display control unit 117 when the incoming call detection unit 114 detects that a call request is received in a state where the broadcasting receiving unit 109 does not receive the television broadcasting waves. The second image includes an icon 201 for responding to the call request, an icon 202 for rejecting the call request, and information about the portable phone which transmits the call request. The user can touch the icon 201 to respond to the call request and to start a call. The user can touch the icon 202 to reject the call request and to reject a call. When the phone number of the portable phone 100 which transmits the call request is beforehand stored in the storage unit 110, the information about the corresponding portable phone may be also displayed.

When it is detected that a call request is received in a state where the television broadcasting waves are not received, the display control unit 117 changes the image displayed on the display unit 112 from the first image to the second image.

Figure 5:
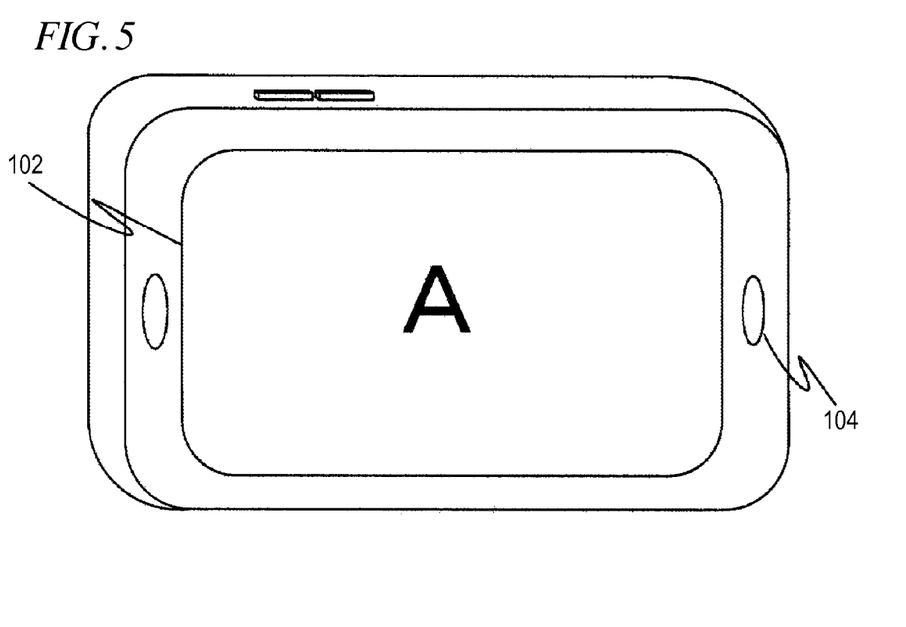
FIG. 5 shows an example of an image which is displayed on the display unit.

FIG. 5 shows an image (hereinafter, also referred to as third image) which is displayed on the display unit 112 by the display control unit 117 when the incoming call detection unit 114 detects that a call request is not received in a state where the broadcasting receiving unit 109 receives the television broadcasting waves. The third image is an image which included in the received broadcasting program. When the incoming call detection unit 114 detects that a call request is not received in a state where the broadcasting receiving unit 109 receives the television broadcasting waves, a moving image of the broadcasting program is displayed on the display unit 112. Meanwhile, in FIG. 5, 'A' is displayed as an example of the image included in the broadcasting program.

Figure 6:
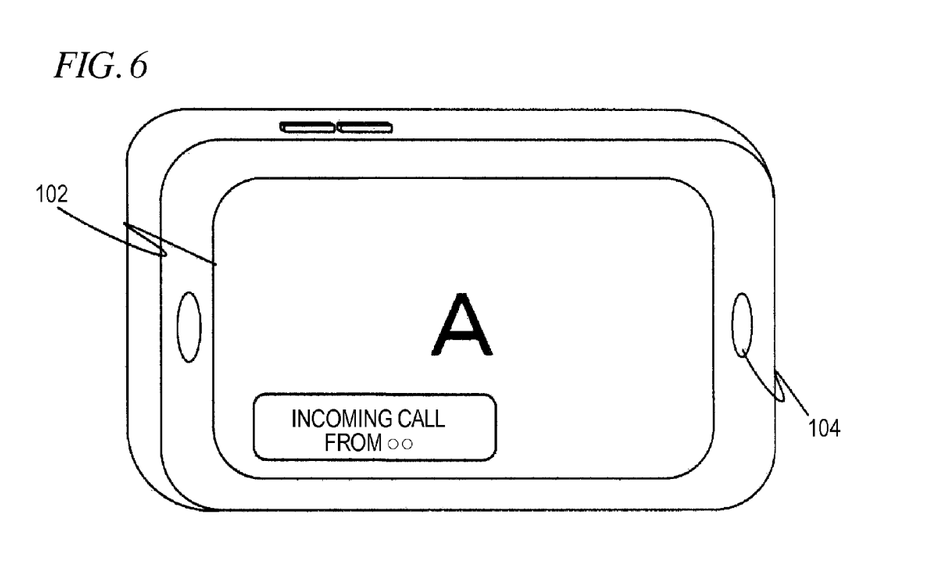
FIG. 6 shows an example of an image which is displayed on the display unit.

FIG. 6 shows an image (hereinafter, also referred to as fourth image) which is displayed on the display unit 112 by the display control unit 117 when the incoming call detection unit 114 detects that a call request is received in a state where the broadcasting receiving unit 109 receives the television broadcasting waves. The fourth image is an image in which information (hereinafter, referred to as call request information) indicative of the reception of the call request is displayed in a part of the area where the third image is being displayed. That is, the fourth image is an image in which the call request information is displayed while overlapping with the broadcasting program being displayed on the display unit 112. The broadcasting program may be displayed as a moving image.

When it is detected that a call request is received in a state where the television broadcasting waves are received, the display control unit 117 changes the image displayed on the display unit 112 from the third image to the fourth image.

Figure 7:
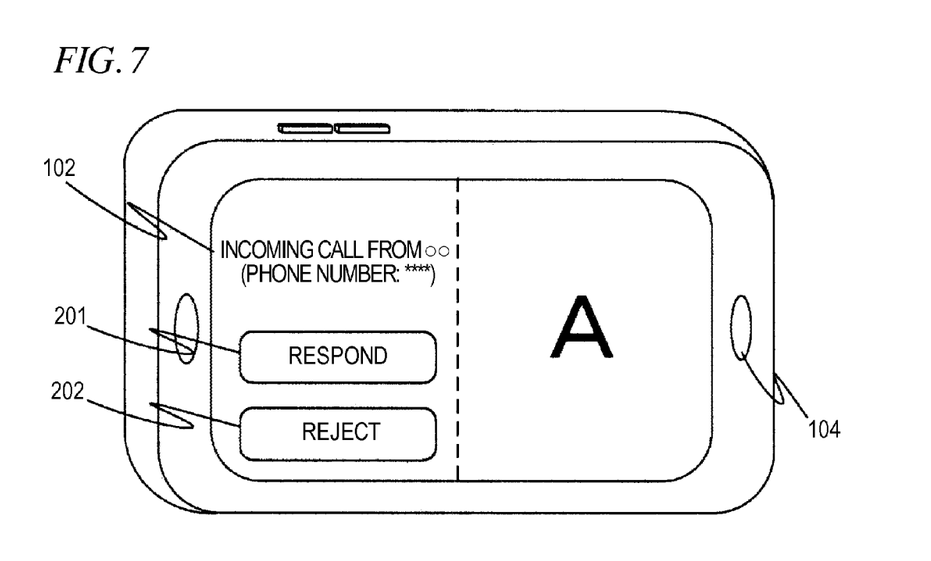
FIG. 7 shows an example of an image which is displayed on the display unit.

FIG. 7 shows control which is performed on the display unit 112 by the display control unit 117 when the input detection unit 116 detects a predetermined touch input of the user in a state where the call request information is displayed while overlapping with the broadcasting program. When a predetermined touch input of the user is detected, the display control unit 117 divides the display area of the display unit 112 into at least first and second areas. The display control unit 117 displays the second image in the first area and displays the broadcasting program in the second area. The user can touch an icon displayed in the first area to thus respond to the call request. In the meantime, the screen shown in FIG. 7 may be also referred to as a fifth image. In this illustrative embodiment, although it is described that the display control unit 117 displays the second image and the fifth image in the different areas, the present invention is not limited thereto. The display control unit 117 may display an icon or information displayed in the second image on the display unit 112 so as to overlap with the area where the broadcasting program is displayed.

The incoming call processing unit 118 can process call processing in the second image and the fifth image, based on the detected touch of the user. When a position of the detected touch of the user is in the area where the icon 201 of the second image or the icon 201 of the fifth image is displayed, the incoming call processing unit 118 starts a call with the portable phone which transmits the call request. When a position of the detected touch of the user is in the area where the icon 202 of the second image or the icon 202 of the fifth image is displayed, the incoming call processing unit 118 rejects a call with the portable phone which transmits the call request. In the below, an operation of the portable phone 100 is described with reference to FIG. 8.

Figure 8:
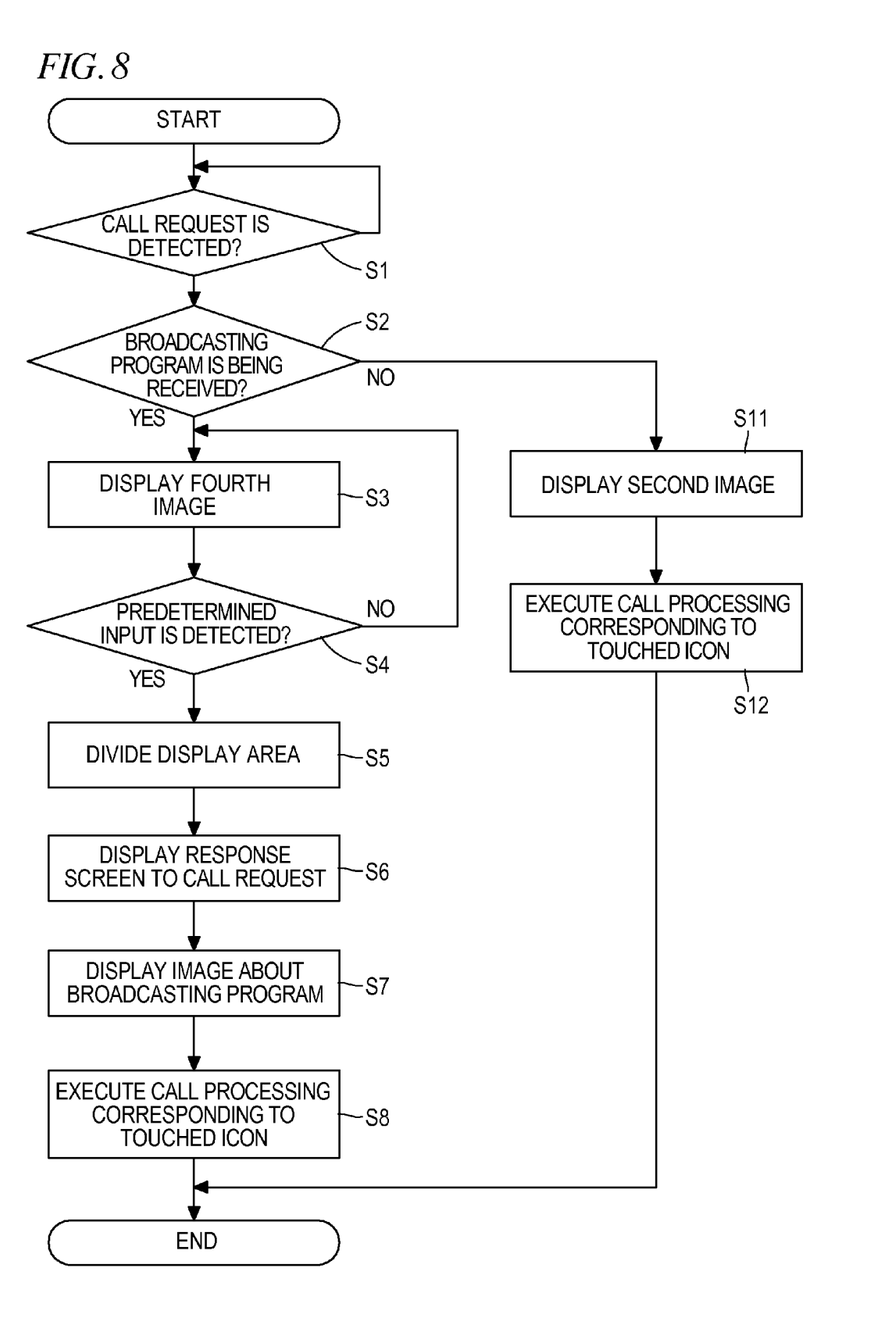
FIG. 8 is a flowchart illustrating processing which is performed in the portable phone.

The incoming call detection unit 114 determines whether a call request is received from another portable phone (S1). When the incoming call detection unit 114 detects that the call request is received (YES in S1), the state determination unit 115 determines whether the broadcasting program is being received (S2). When the state determination unit 115 determines that the broadcasting program is not being received (NO in S2), the display control unit 117 displays the information about the other party which transmits the call request on the display unit 112 (S11), like the second image, for example. Then, the incoming call processing unit 118 executes the call processing corresponding to the touched icon (S12). The incoming call processing unit starts a call when the user touches the icon 201 or rejects a call when the user touches the icon 202.

When the state determination unit 115 determines that the broadcasting program is being received (YES in S2), the display control unit 117 displays the information, which indicates that the call request is received, in a part of the area on the display unit 112 where the broadcasting program is being displayed (S3), like the fourth image, for example.

The input detection unit 116 determines whether the user has made a predetermined touch input (S4). When the input detection unit 116 determines that a predetermined touch input has been made (YES in S4), the display control unit 117 divides the display area of the display unit 112 into at least first and second areas (S5), like the fifth image, for example. Then, the display control unit 117 displays the information about the other party which transmits the call request and the information about a response to the call request in the first area (S6). Also, the display control unit 117 displays an image about the broadcasting program in the second area (S7).

The incoming call processing unit 118 starts a call when the icon 201 is touched or rejects a call when the icon 202 is touched (S8).

After the incoming call processing unit 118 starts or rejects a call, the display control unit 117 ends the division of the display area and displays the image about the broadcasting program, like the third image, for example.

According to the above processing, when the call request is received while the broadcasting program is being displayed, the portable phone 100 does not display a screen for enabling the user to execute the processing relating to the call request until the predetermined touch input of the user is received. Thereby, when the call request is received in a state where an application is being executed, for example, it is possible to avoid responding to the call request at an unintended timing of the user.

Other Illustrative Embodiments (1) In the above illustrative embodiment, the state determination unit 115 determines whether the broadcasting program is being received. However, the present invention is not limited thereto. For example, the state determination unit 115 may determine whether an application is being executed at the time that the call request is received. The application may include a mail preparing application, an application reproducing a moving image or still image captured by a camera when an imaging unit such as camera is provided to the portable phone, an application reproducing music data, and the like. In this case, the third image, the fourth image and the image displayed in the second area are images which are displayed when those applications are executed.

(2) In the above illustrative embodiment, the moving image which is displayed on the display unit 112 is not necessarily limited to the broadcasting program. For example, in the above illustrative embodiment, the portable phone 100 may include a second antenna and a second wireless communication unit different from the antenna 106 and the wireless communication unit 107. And the portable phone 100 may receive a moving image and the like from a server existing on the network through the second antenna and the second wireless communication unit. In this case, for example, the wireless communication unit 107 may employ a CDMA communication protocol and the second wireless communication unit may employ an LET communication protocol. The second wireless communication unit may employ a WiMAX communication protocol.

(3) In the above illustrative embodiment, the portable phone 100 may further include a vibration detection unit such as acceleration sensor. The vibration detection unit can detect vibration. When the vibration detection unit detects vibration while the fourth image is being displayed, for example, the incoming call processing unit 118 may reject a call request from another portable phone.

Figure 9:
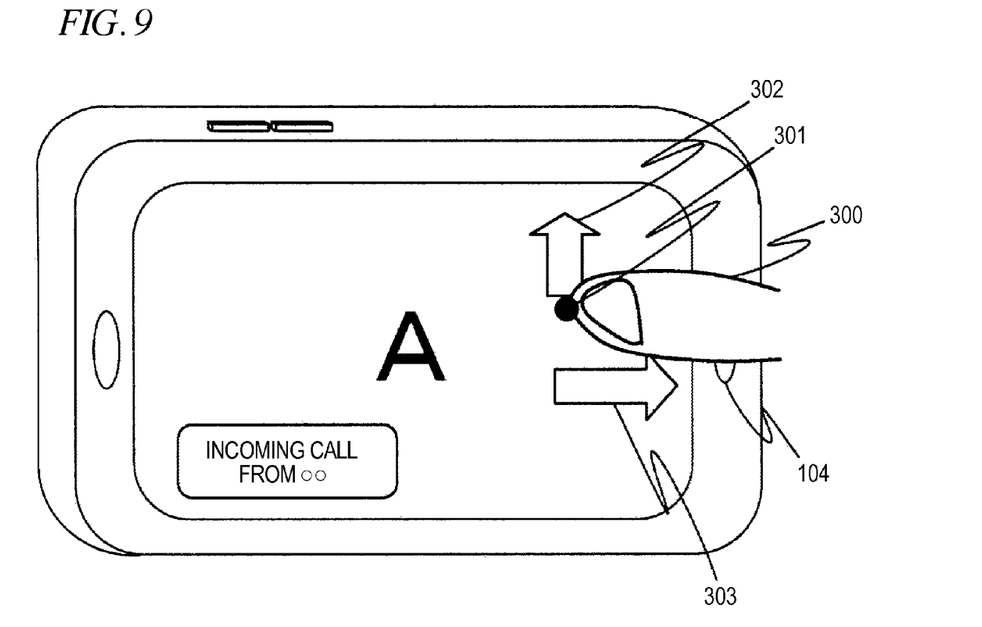
FIG. 9 shows an example of an image which is displayed on the display unit.
Figure 10:
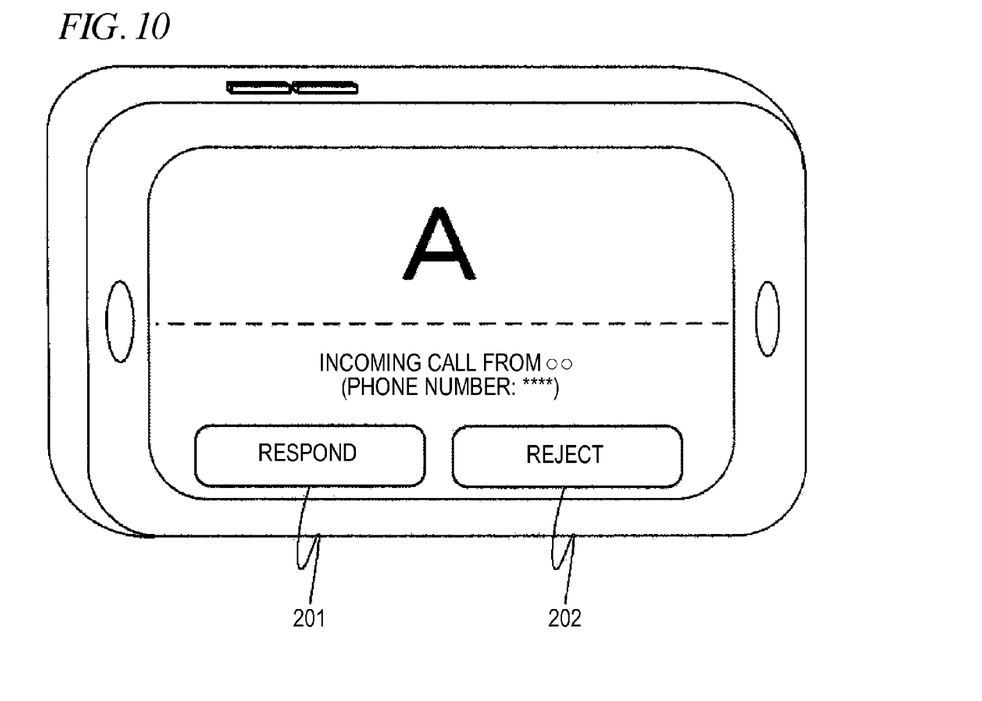
FIG. 10 shows an example of an image which is displayed on the display unit.

(4) In the above illustrative embodiment, the display control unit 117 displays the fifth image when the predetermined input of the user is detected. However, the present invention is not necessarily limited to the fifth image. For example, in a state where the fourth image is displayed as shown in FIG. 9, when a touch 301 of the user is moved in a direction of an arrow 302 after the touch 301 is detected, the display control unit 117 may set the first and second areas, as shown in FIG. 10. In a state where the fourth image is displayed as shown in FIG. 9, for example, when the touch 301 of the user is moved in a direction of an arrow 303 after the touch 301 is detected, the display control unit 117 may set the first and second areas, as shown in FIG. 7.

(5) The portable phone 100 may further have a ringtone notification unit which generates a ringtone when a call request is received and a vibration notification unit which vibrates when a call request is received. When the state determination unit 115 determines that the broadcasting program is being received at the time when a call request is received, the ringtone notification unit may not execute the ringtone notification. When the state determination unit 115 determines that the broadcasting program is being received at the time when a call request is received, the vibration notification unit may not execute the vibration notification. In the meantime, regarding the notification, a light emitting unit such as LED may be used. When the state determination unit 115 determines that the broadcasting program is being received at the time when a call request is received, the light emitting unit may not execute the notification.

(6) In the above (5), it is described that when the state determination unit 115 determines that the broadcasting program is being received at the time when a call request is received, the ringtone notification unit, the vibration notification unit and the light emitting unit does not execute the notification. However, the present invention is not necessarily limited thereto. The storage unit 110 may store at least one or more portable phone numbers and the ringtone notification unit, the vibration notification unit and the light emitting unit may determine whether or not to notify the call request, depending on whether the portable phone number of the portable phone which transmits the call request is stored in the storage unit 110. For example, when the state determination unit 115 determines that the broadcasting program is being received at the time when a call request is received, the ringtone notification unit, the vibration notification unit and the light emitting unit may execute the notification if the portable phone number of the portable phone which transmits the call request is stored in the storage unit 110. When the state determination unit 115 determines that the broadcasting program is being received at the time when a call request is received, the ringtone notification unit, the vibration notification unit and the light emitting unit may not execute the notification if the portable phone number of the portable phone which transmits the call request is not stored in the storage unit 110. Thereby, it is possible to more surely notify the user of the call request from the specific portable phone.

Also, when the state determination unit 115 determines that the broadcasting program is being received at the time when a call request is received, the display control unit 117 may switch the displayed image from the third image to the fifth image if the portable phone number of the portable phone which transmits the call request is stored in the storage unit 110, irrespective of whether a predetermined input of the user is detected or not.

Also, when the state determination unit 115 determines that the broadcasting program is being received at the time when a call request is received, the display control unit 117 may switch the displayed image from the third image to the second image if the portable phone number of the portable phone which transmits the call request is stored in the storage unit 110, irrespective of whether a predetermined input of the user is detected or not.

Thereby, when the call request is received from the specific portable phone, the user can respond to the call request immediately. In the meantime, the phone number and the like relating to another portable phone may be also included in the call request.

(7) In the above (6), when storing the portable phone number in advance, the storage unit 110 may store information about a priority number together. When the state determination unit 115 determines that the broadcasting program is being received at the time when a call request is received, the control unit 111 may change a combination of the notifications, depending on the priority number, if the portable phone number of the portable phone which transmits the call request is stored in the storage unit 110. For example, if the priority number is set as either one of 1 to 3, when a call request is received from the portable phone number of the priority number 1, the control unit 111 may perform the display of the information about the portable phone number, the ringtone notification, the vibration notification and the light emission notification. When a call request is received from the portable phone number of the priority number 2, the control unit may perform the display of the information about the portable phone number, the vibration notification and the light emission notification without the ringtone notification. When a call request is received from the portable phone number of the priority number 3, the control unit may not execute any notification.

(8) In the above illustrative embodiment, the incoming call processing unit 118 rejects the call request when the user touches an icon. However, the present invention is not necessarily limited thereto. When the icon is touched, the incoming call processing unit 118 may transfer the call request to an automatic response service. When an operation is received by the operation unit 105, the incoming call processing unit 118 may reject the call request.

(9) In the above illustrative embodiment, when the vibration is detected by the vibration detection unit, the incoming call processing unit 118 rejects the call request. However, the present invention is not necessarily limited thereto. For example, when the vibration is detected by the vibration detection unit, the incoming call processing unit 118 may transfer the call request to an automatic response service. Also, when an operation is received by the operation unit 105, the incoming call processing unit 118 may transfer the call request to the automatic response service.

(10) In the above illustrative embodiment, the broadcasting program and the information about the response to the call request are displayed in the different areas (i.e. the first area and the second area). However, the present invention is not necessarily limited thereto. For example, the information about the response to the call request may be displayed to overlap with an image representing the broadcasting program.

(11) In the above illustrative embodiment, the call request from another portable phone is exemplified. However, the present invention is not necessarily limited thereto. For example, the above illustrative embodiment may be also applied to a case where a mail is transmitted from another portable phone. In this case, in the second and fifth images, the icon 201 is replaced with an icon for executing a display of a received mail, and the icon 202 is replaced with an icon for not executing a display of a received mail, respectively. Also, the information which is transmitted from another portable phone, such as call request and mail which are transmitted from another portable phone, may be collectively referred to as an incoming request or a communication request. In this case, the information about the other portable phone (for example, phone number, mail address, inherent ID number and the like of the other portable phone) may be transmitted while being included in the call request, the transmitted mail and the like.

Also, in the above illustrative embodiment, the portable phone 100 determines the information which is displayed on the display unit 112, based on the phone number. However, the present invention is not necessarily limited thereto. For example, the storage unit 110 may store the phone number, mail address, unique ID number and the like of a portable phone, and the portable phone 100 may determine the information which is displayed on the display unit 112, based on the information about another portable phone, which is transmitted from the other portable phone.

(12) In the above illustrative embodiment, the portable phone is described. However, the present invention is not necessarily limited to the portable phone. For example, the inventive concept of the present invention can be applied to a portable electronic device having a communication function, such as PDA. In the meantime, the portable electronic device having a communication function may be also referred to as a communication device.

(13) In the above illustrative embodiment, it is described that the portable phone 100 receives the call request transmitted from another portable phone. However, the present invention is not necessarily limited thereto. For example, the portable phone 100 may receive a call request which is transmitted from a portable electronic device having a communication function, such as PDA.

What is claimed is:

1. A portable electronic device comprising:
a communication request receiving unit which receives a communication request from another communication device;
a display unit which displays a moving image based on image data;
an input unit which is provided to overlap with the display unit and detects an input of a user;
a determination unit which determines whether the moving image is being displayed on the display unit at the same time that the communication request receiving unit receives the communication request;
an input determination unit which determines whether a predetermined input is detected by the input unit when the determination unit determines that the moving image is being displayed; and
a display control unit which displays information for starting a communication with the other communication device on the display unit when the predetermined input is detected by the input unit, wherein
when the communication request receiving unit receives the communication request, the display control unit displays information overlapped on the moving image being displayed on the display unit without displaying an area in which an input is detected for starting the communication with the other communication device, and
when the predetermined input is detected by the input unit, the display control unit displays the information which includes the area in which an input is detected for starting the communication with the other communication device.

2. A portable electronic device comprising:
a communication request receiving unit which receives a communication request from another communication device;
an image receiving unit which receives image data from an external device;
a display unit which displays a moving image based on the image data received by the image receiving unit;
an input unit which is provided to overlap with the display unit and detects an input of a user;
a determination unit which determines whether the moving image is being displayed on the display unit at the same time that the communication request receiving unit receives the communication request;
an input determination unit which determines whether a predetermined input is detected by the input unit when the determination unit determines that the moving image is being displayed; and
a display control unit which displays information for starting a communication with the other communication device on the display unit when the predetermined input is detected by the input unit, wherein
when the communication request receiving unit receives the communication request, the display control unit displays information overlapped on the moving image being displayed on the display unit without displaying an area in which an input is detected for starting the communication with the other communication device, and
when the predetermined input is detected by the input unit, the display control unit displays the information which includes the area in which an input is detected for starting the communication with the other communication device.

3. The portable electronic device according to claim 2, wherein when the predetermined input is detected by the input unit, the display control unit divides a display area of the display unit into at least first and second display areas, displays the information for starting a communication with the other communication device in the first display area, and keeps displaying the moving image based on the received image data in the second display area.

4. The portable electronic device according to claim 2, wherein when the predetermined input is detected by the input unit, the display control unit displays the information for starting a communication with the other communication device on the display unit to overlap with the moving image being displayed on the display unit.

5. The portable electronic device according to claim 2, further comprising:
a communication request notification unit which notifies that the communication request is received when the communication request receiving unit receives the communication request;
a storage unit which stores at least one or more phone numbers;
an acquisition unit which acquires a phone number of the other communication device when the communication request receiving unit receives the communication request; and
a number determination unit which determines whether the acquired phone number is matched with any of the phone numbers stored in the storage unit,
wherein when the communication request receiving unit receives the communication request, the communication request notification unit does not notify that the communication request is received if the number determination unit determines that the acquired phone number is not matched with any of the phone numbers stored in the storage unit.

6. The portable electronic device according to claim 5, wherein the storage unit stores the one or more phone numbers in association with a priority number, and
wherein the communication request notification unit includes a plurality of different notification units, and selects one or more notification units from the plurality of notification units for notifying the communication request based on the priority number when the number determination unit determines that the acquired phone number is matched with the phone number stored in the storage unit.

7. The portable electronic device according to claim 2, further comprising:
a vibration detection unit which detects vibration; and
an incoming request processing unit which rejects the communication request if the vibration detection unit detects vibration when the determination unit determines that the moving image is being displayed.

8. The portable electronic device according to claim 2, further comprising:
a vibration detection unit which detects vibration; and
an incoming request processing unit which transfers the communication request to an automatic response service if the vibration detection unit detects vibration when the determination unit determines that the moving image is being displayed.

9. The portable electronic device according to claim 2, wherein the predetermined input is a touch and a movement of the touch successive to the touch.

10. The portable electronic device according to claim 9, wherein when the touch is moved in a first direction, the display control unit divides a display area of the display unit by a first mode, and when the touch is moved in a second direction different from the first direction, the display control unit divides the display area of the display unit by a second mode different from the first mode.

11. The portable electronic device according to claim 9, wherein when the touch is moved in a first direction, the display control unit divides a display area of the display unit into two display areas arranged in a first division direction, and when the touch is moved in a second direction intersecting with the first direction, the display control unit divides a display area of the display unit into two display areas arranged in a second division direction intersecting with the first division direction.

12. The portable electronic device according to claim 11, wherein the first direction is substantially in parallel with the first division direction, and the second direction is substantially in parallel with the second division direction.

13. The portable electronic device according to claim 2, wherein when the determination unit determines that the moving image is not being displayed, the display control unit displays information for stating a communication with the other communication device on the display unit without detecting the predetermined input.

14. A control method of a portable electronic device which includes a display unit and an input unit provided to overlap with the display unit, the control method comprising:
receiving a communication request from another communication device;
displaying a moving image based on image data on the display unit;
detecting an input of a user by the input unit;
determining whether the moving image is being displayed on the display unit at the same time that the communication request is received;
determining whether a predetermined input is detected by the input unit when it is determined that the moving image is being displayed; and
displaying information for starting a communication with the other communication device on the display unit when it is determined that the predetermined input is detected by the input unit, wherein
when receiving the communication request, displaying information overlapped on the moving image being displayed on the display unit without displaying an area in which an input is detected for starting the communication with the other communication device, and
when the predetermined input is detected by the input unit, displaying the information which includes the area in which an input is detected for starting the communication with the other communication device.

* * * * *